Oct. 30, 1962  E. SCHLUETER  3,061,347
HOOK LOCK
Filed May 17, 1960

INVENTOR.
Ernest Schlueter
BY
F. K. Jenkins
AGENT

United States Patent Office 3,061,347
Patented Oct. 30, 1962

3,061,347
HOOK LOCK
Ernest Schlueter, 74 Edwards Road, Troy, N.Y.
Filed May 17, 1960, Ser. No. 29,737
2 Claims. (Cl. 292—111)

This invention relates to fasteners and more particularly to fasteners wherein a hook member engages a keeper member and is then retracted to locked position.

In the erection of portable or dismountable housing, the securing of a cover on a container or the quick erection and dismounting of frameworks, to mention only a few types of operation, it is frequently desirable to employ fasteners which can be readily manipulated to locked and unlocked position. Such fasteners must, in many instances, be most durable, operable in all kinds of weather, for example they must not hold water to freeze subsequently and jam the fastener, nor must they admit desert sands to interfere with bearing surfaces or clog moving parts. In the event of corrosion they must allow access of "rust breaking" fluids, be attachable by simple means to the structures to be fastened to say nothing of the desirability of low weight and operated with the simplest or no tools.

Moreover the fastener must be such that its mating members can be brought generally near each other without danger of knocking one of the members out of position for easy subsequent manipulations. For one-man jobs a loose engagement is desirable so that say, two structural members may be engaged in approximate position and then shifted to a more exact position before being secured tightly.

It is an object of the present invention therefor to provide a fastener which is economical to manufacture, operable over a wide range of climatic conditions, is easily manipulated and yet is rugged and can take severe loading.

These objects are obtained in a hook fastener which, briefly described includes a hook member and keeper therefor and means for turning and retracting the hook member to hook over the keeper. Means are provided to limit the turning of the hook member and preventing undue disalinement of the keeper during retraction of the hook member.

In the accompanying drawing showing, by way of example, one of many possible embodiments of the invention, FIG. 1 is a side view of the invention in locked position;

This invention is illustrated in connection with two panel or adjoining members 10 and 11 for walls of takedown housings, frameworks, containers having slide closures, trunk-like containers, to mention only a few types of fastened structures or combinations.

Figure 1:
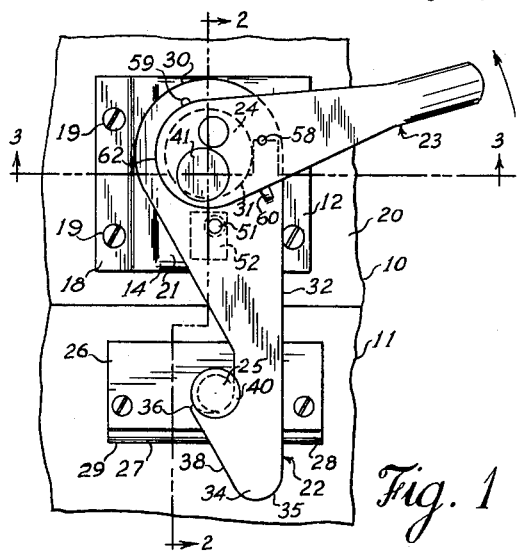
Figure 2:
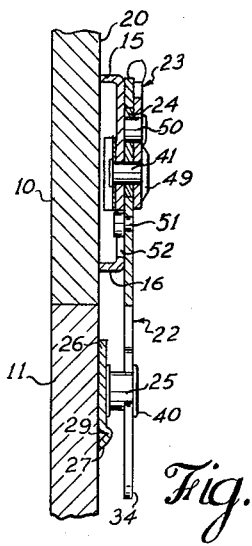
FIG. 2 is a longitudinal sectional view of the invention as shown in FIG. 1, the section taken substantially along line 2—2 of FIG. 1 looking in the direction of the arrows of said line.
Figure 3:
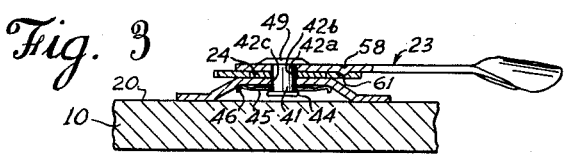
FIG. 3 is a sectional view of the invention as shown in FIG. 1, the section being taken substantially along the broken line 3—3 of FIG. 1 looking in the direction of the arrows of said line.

One of the adjoining members has secured thereto a base 12 of sheet metal such as 1/16 inch steel, generally square and provided with a rectangular off-set central planar portion 14 constituting the major portion of the base. The marginal portions of the base due to the off-set, are turned at the upper and lower edges 15 and 16 as shown in FIGS. 1 and 2 toward the member 10, while the lateral margins are also developed as mounting flanges 18 provided with holes for mounting screws 19.

The marginal portions 15, 16 and 18 all terminate in the plane of the outer face 20 of the member 10 so that moisture and dirt may not appreciably enter under the base to cause rusting or interfere with operation of the hook as described below.

Disposed on the outer face 21 of the central planar portion 14 are a hook member generally designated 22, and a circular eccentric disc 24 therein, both of about 3/32 inch sheet steel and coplanar. Over and against the hook and disc is a lever-like operating handle 23 of sheet steel, which completely covers the disc, the latter being for reciprocating the hook by a turning of the handle.

The hook member 22 cooperates with an end-flanged keeper stud 25 bradded on a plate 26 mounted on the member 11. The plate 26 is generally rectangular having the longer dimension transverse to the direction of reciprocatory movement of the hook member. The outer, or as shown the lower, edge portion 27 of the plate 26 is provided with a crimp 28 having a ramp portion 29 for the hook member to slide easily up upon the plate to the stud 25.

The hook member 22 is of somewhat inverted tear-shape, having a rounded portion 30 at one end which is disposed on the outer planar base face 21 and provided with a circular hole 31 receiving, with clearance of about 0.005 inch preferably, the eccentric 24. The hook member 22 has a long outer side edge 32, tangential to the rounded portion 30, and more or less parallel with a line from the axis of rotation of the eccentric to the stud when the fastener is in locked position. The opposite end portion 34 is somewhat triangular and includes, merging with the side edge 32, a rounded end 35 and a small but rounded nose 36 having a substantially straight edge 38 therebetween. The end portion 34 is provided with a keeper-receiving recess 39 opening toward the disc 24 and laterally away from the edge 32 so that the end portion 34 may engage about a portion of the stud 25 beneath its end flange 40.

The handle 23, hook member 32, and eccentric disc 24 are all mounted on the base off-set 14 by a cylindrical brad 41 passing therethrough in holes 42a, 42b and 42c respectively with substantially no play, the hole 42b being eccentric on the disc and the hole 42c at about the center of the off-set. The inner end of the brad is outturned at 44 against a rectangular spring washer 45 having ends 46 turned along the off-set of the base as at 48 the washer being bowed to draw the head 49 of the brad against the handle 23. The disc 24 and handle are secured against relative rotation by a pin 50 force-fitted in the disc and passing through the handle.

It is highly desirable that the hook member 22 be limited against rotation, within rather narrow limits, with respect to the base 12 during motion of the handle, and also that the handle itself be limited in turning for reasons given next below.

When two panel members such as 10 and 11 are being fastened together there is a tendency for turning of the handle to cause a swinging of the hook member. With this swinging or turning not limited, relative slippage of the panel member would often result, and false tightness between the panels appear. Furthermore, during one-man operation attempts at lining up the hook and keeper would often cause the end portion 34 to be knocked or swung out of position so that no loose engagement of the hook and keeper could be made to say nothing of the action of gravity causing various pending positions of the hook member when the panels are not as shown.

The swinging or turning movement of the hook member is restrained to about 25° by a restraining pin 51 fast on the hook member and projecting into a window 52 through the off-set 14 between brad 41 and the edge portion 16. This window is preferably rectangular, as shown, since lateral edges 54 and 55 may be straight and provide suitable movement of the hook.

Figure 4:
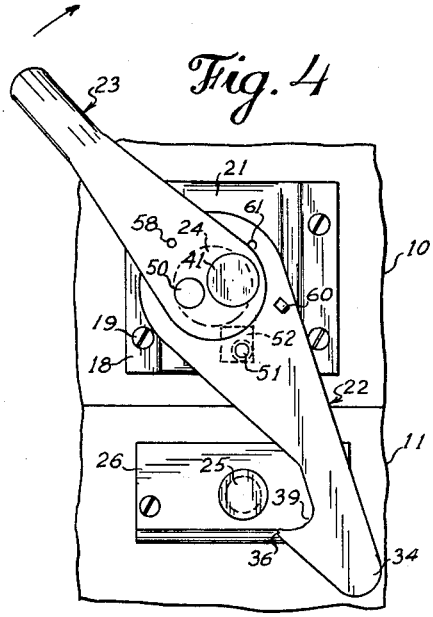
FIGS. 4 and 5 are operational side views of the invention.
Figure 5:
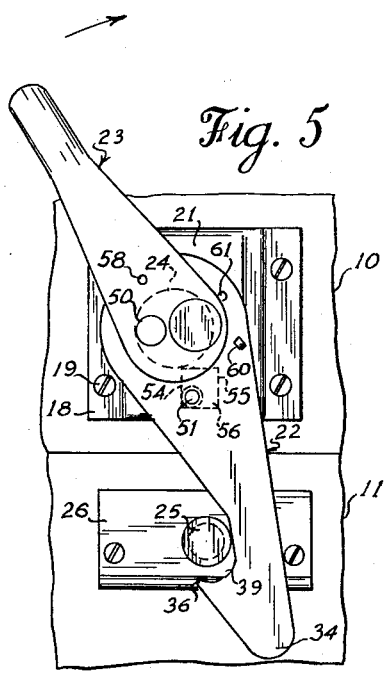

This is shown in FIGS. 1, 4 and 5, the initial action being shown during the fastening action shown in FIG. 4 wherein the hook is most remote from the keeper 25 due to the engagement of the pin 51 in the lower right corner 56. The centering of the disc prevents further counter clockwise motion of the handle from this position although it is preferable that the handle be provided with a detent 58 for engagement in a depression 59 in the hook member when handle and hook member are in this relative position.

Initial locking movement from the position shown in FIG. 4 causes the handle and hook member to turn together due to the detential engagement to the position shown in FIG. 5 with the pin 51 now against the window edge 54 so that the nose 36 passes under the keeper 25 and the movement of the hook member is primarily a retractive movement.

Movement from position in FIG. 5 to that in FIG. 1, just past dead center, exerts very little turning movement on the hook due to the greater component being in the direction of the edge 54. As the panels 10 and 11 approach each other there is normally sufficient friction between the panels to prevent their slippage as dead center is approached.

Stoppage just past dead center is effected by a stop 60 on the hook member engageable with the handle 23. Preferably, the hook member 22 is provided with a detent recess 61 to receive the detent 58 substantially at dead center to deter unlocking movement of the handle. The extreme amount of turning of the handle is about 110° as shown.

The spring washer 45 exerts a powerful action on the pivot brad 41 so that the detents at 59 and 61 give noticeable feeling signals when dead center has been reached. The recess 59 enables the turning of the hook from FIG. 5 to FIG. 4 position during unlocking.

In fasteners in general, springs are often a source of trouble due to corrosion or wear if the spring may rub against a surface. The spring washer 44 is secured substantially integrally to the brad at 44 and its outer end edges at 46 nest in the off-set at 48 to prevent turning of the washer on the base.

The base edge portions 15 and 16, in engagement with the member 10, prevent grit and foreign matter from getting under the base to interfere with movement of the restraining pin 51, as do the marginal parts 18. The end portion 30 of the hook member is wide enough to cover the window 52 at all times. The handle 23 is rounded at its pivot end 62 to avoid dangerous points and it covers the eccentric disc 24 completely at all positions to prevent corrosion at camming surfaces. Moreover, the window 52 is remote from the disc so that the off-set 14 also covers the disc at the interior.

The ends 46 of the washer 45 being bent to form flanges, provide increased resistance to any turning of the brad head toward the keeper after wear may begin to take place at the holes through handle and disc. So long as the brad or rivet 41, or the material at its bearing hole does not become worn, the main force on the brad is one of shear. Wear tends to allow the brad to cant and the flanges at 46 tend to prevent canting. However the flanges do not interfere with motion of the brad along its major axis which is necessary to permit proper action of the detents 58, 59, 61.

There is sufficient friction between the handle, hook member and base 12 so that, due to the spring 45, the hook and handle can be set in a convenient position for easing the keeper within range of the hook and often obtaining a loose engagement. This is of considerable importance when an operator or user cannot have reach of the handle when he is moving a keeper bearing structure to approximate position. If the hook were not moderately restrained against movement the initial, or loose, engagement would be most difficult if upright panels were being joined and the weight of the hook or handle caused them to assume locked position.

Highly viscose lubricant on the rubbing surfaces prevents galling and also tends to prevent the entrance of moisture to the camming surfaces of the disc to cause rust. Other bearing surfaces such as between the base 12 and hook member and, to a lesser extent, between handle and hook member can be broken apart, if rusted, by an outward pull on the handle sufficient to admit a rust penetrant because of the resilience of the spring washer. Rust under the head 49 is generally of little importance owing to the fact that the head is near the axis of rotation.

The invention claimed is:

1. A hook lock fastener comprising a base of sheet metal having a rectangular offset portion to form a perimetric flange and the offset portion having an exterior planar surface; a hook member of sheet material having an end portion disposed on the surface and provided with a circular opening; a disc shaped cam member of about the same diameter as that of the opening and therein for moving the hook member relative to said surface; a handle for turning the cam member and overlying the opening of the hook member; a cylindrical pivot member having a head and passing through the handle, cam member and base, the hook and cam members being turnable with respect to the pivot member, a generally rectangular bowed spring nested in the base and against the flange at the offset portion to prevent the spring from turning in the base, and secured fast to the pivot member to avoid relative rubbing by the base and pivot member on the spring, and hold the handle, cam member and hook member on the base, said handle and hook member being provided with a projection and recesses respectively forming detent means disengageable against the resilience of said spring and equidistant from the axis of the pivot member to selectively hold the hook member and handle in at least two angular positions with respect to each other, and means to limit the degree of turning of the hook member with respect to the base, so that the handle is detained in a predetermined range with respect to the base.

2. A hook lock fastener comprising a base having planar inner and outer faces; a hook member having a flat end portion disposed on the outer face and provided with a circular opening therethrough, an eccentric disc of substantially the same diameter as that of the opening disposed therein and against the face and turnable with respect to the base for reciprocating the hook member; an operating member disposed over said end portion in face-to-face contact therewith and covering said opening and secured fast with respect to the disc; the base having an aperture at said outer face and having edge walls, a projection on the hook member extending into the aperture and engageable with said edge walls to limit turning of the hook member when the eccentric disc rotates, said aperture being remote from said opening so that matter may not pass substantially through the aperture to the eccentric disc and opening, said hook member being provided with a nose portion and recess thereat remote from the base, said base having a solid rectangular perimetric flange terminating in a substantially common plane so that when the base is mounted on a structure having a planar surface, foreign matter may not enter between the structure and the base to interfere with movement of the projection in the aperture, a rectangular bowed spring adjacent the base inner face remote from the aperture and having end portions against opposite sections of the flange to prevent turning of the spring, said operating member, disc and base being provided with bearing holes, the hole in the disc being eccentric, and a headed pin having the head thereof engaging on the operating member and passing through said holes and secured fast to the mid-portion of the spring to hold the operating member with disc on the base, the operating and hook members being provided at their interface with a detent projection on one member and with recesses for the detent projection in the other member remote from the pin to provide a lost motion movement of the operating member with respect to the hook member.

References Cited in the file of this patent

UNITED STATES PATENTS

| | | |
|---|---|---|
| 1,081,538 | Larsen | Dec. 16, 1913 |
| 2,216,414 | Calkins | Feb. 20, 1917 |
| 2,676,825 | Ross | Apr. 27, 1954 |

FOREIGN PATENTS

| | | |
|---|---|---|
| 101,307 | Sweden | Apr. 8, 1941 |
| 119,939 | Sweden | Oct. 14, 1947 |